United States Patent
Kollep et al.

(10) Patent No.: US 10,893,771 B2
(45) Date of Patent: Jan. 19, 2021

(54) RECONFIGURABLE BEVERAGE PREPARATION MACHINE

(71) Applicant: NESTEC S.A., Vevey (CH)

(72) Inventors: Alexandre Kollep, Lutry (CH); Remy Jacquet, Le Locle (CH)

(73) Assignee: Societe des Produits Nestle S.A., Vevey (CH)

(*) Notice: Subject to any disclaimer, the term of this patent is extended or adjusted under 35 U.S.C. 154(b) by 368 days.

(21) Appl. No.: 15/517,596

(22) PCT Filed: Sep. 11, 2015

(86) PCT No.: PCT/EP2015/070809
§ 371 (c)(1),
(2) Date: Apr. 7, 2017

(87) PCT Pub. No.: WO2016/055231
PCT Pub. Date: Apr. 14, 2016

(65) Prior Publication Data
US 2017/0303727 A1  Oct. 26, 2017

(30) Foreign Application Priority Data
Oct. 8, 2014  (EP) .................................... 14188026

(51) Int. Cl.
*A47J 31/36* (2006.01)
*A47J 31/44* (2006.01)

(52) U.S. Cl.
CPC ....... *A47J 31/3633* (2013.01); *A47J 31/4403* (2013.01); *A47J 2201/00* (2013.01)

(58) Field of Classification Search
CPC ........ A47J 31/36; A47J 31/3633; A47J 31/44; A47J 31/4403; A47J 31/3676

(Continued)

(56) References Cited

U.S. PATENT DOCUMENTS 3,218,955 A * 11/1965 Lorang ................... A47J 31/00
  219/452.11
3,848,524 A * 11/1974 Semrow .................. A23N 7/00
  366/205

(Continued)

FOREIGN PATENT DOCUMENTS

EP  1153561       11/2001
EP  1267687 A1   1/2003

(Continued)

OTHER PUBLICATIONS

EP Patent Application Filed on Jul. 9, 2014 with Application No. 14176243.5, Titled "Capsule Processing Unit of Beverage Preparation Machine", 35 pages.

(Continued)

*Primary Examiner* — Lorne E Meade
*Assistant Examiner* — Ayub A Maye
(74) *Attorney, Agent, or Firm* — K&L Gates LLP

(57) ABSTRACT

A beverage preparation machine comprising: a beverage preparation module comprising an extraction unit to extract an ingredient of a beverage from capsule supplied thereto or an ingredient container which is part thereof; a fluid supply comprising the components a fluid heater, a fluid pump, optionally a fluid reservoir; a first module movably connected to the beverage preparation module; wherein the beverage preparation machine further comprises a second module movably connected to the first module, the first module comprising the fluid pump and/or the fluid heater, the second module comprising the said components of the fluid supply different to those of the first module, the components comprising at least one of the fluid pump or fluid heater or fluid reservoir.

20 Claims, 8 Drawing Sheets

(58) Field of Classification Search
USPC .................................. 99/275, 279, 291, 295
See application file for complete search history.

(56) References Cited

U.S. PATENT DOCUMENTS

| | | | | |
|---|---|---|---|---|
| 4,089,367 | A * | 5/1978 | Wietzel | A23B 4/0053 165/101 |
| 4,757,753 | A * | 7/1988 | Pandolfi | A47J 31/36 99/290 |
| 6,182,555 | B1 * | 2/2001 | Scheer | A47J 31/40 222/129.1 |
| 6,550,958 | B2 * | 4/2003 | Buchsteiner | A47J 36/165 366/292 |
| 8,887,622 | B2 * | 11/2014 | Bentley | A47J 31/44 99/290 |
| 9,675,204 | B2 * | 6/2017 | Cahen | A47J 31/4485 |
| 2002/0121197 | A1 * | 9/2002 | Mercier | A23F 3/18 99/279 |
| 2005/0258186 | A1 * | 11/2005 | Hart | A47J 31/007 222/1 |
| 2008/0148950 | A1 * | 6/2008 | Cahen | A47J 31/4482 99/275 |
| 2013/0014647 | A1 * | 1/2013 | Mori | A47J 31/4403 99/279 |
| 2013/0200063 | A1 * | 8/2013 | Cooke | A47J 41/0044 219/439 |
| 2013/0287914 | A1 * | 10/2013 | Fragniere | A47J 31/3695 426/416 |
| 2014/0007776 | A1 * | 1/2014 | Mori | A47J 31/3633 99/289 R |

FOREIGN PATENT DOCUMENTS

| | | |
|---|---|---|
| EP | 1352599 | 10/2003 |
| EP | 1523913 | 4/2005 |
| EP | 1864598 | 12/2007 |
| EP | 2393404 A1 | 12/2011 |
| EP | 2470053 A1 | 7/2012 |
| EP | 2509473 A1 | 10/2012 |
| EP | 2533672 A2 | 12/2012 |
| EP | 2594171 A1 | 5/2013 |
| EP | 2685874 A1 | 1/2014 |
| FR | 2544185 | 10/1984 |
| WO | 2008037642 A2 | 4/2008 |
| WO | 2009113035 A2 | 9/2009 |
| WO | 2009115474 A1 | 9/2009 |
| WO | 2011135479 | 11/2011 |
| WO | 2012055767 | 5/2012 |
| WO | 2012084705 A1 | 6/2012 |
| WO | 2013014142 A1 | 1/2013 |
| WO | 2014056641 | 4/2014 |

OTHER PUBLICATIONS

Chinese Office Action for Chinese Patent Appl No. 201580050232.0 dated May 28, 2020.
Chinese Office Action for Appl No. 201580050232.0 dated May 28, 2020.

* cited by examiner

RECONFIGURABLE BEVERAGE PREPARATION MACHINE

CROSS REFERENCE TO RELATED APPLICATIONS

The present application is a National Stage of International Application No. PCT/EP2015/070809, filed on Sep. 11, 2015, which claims priority to European Patent Application No. 14188026.0, filed on Oct. 8, 2014, the entire contents of which are being incorporated herein by reference.

TECHNICAL FIELD

The present invention relates to a beverage preparation machine that can be reconfigured to fit in various locations.

BACKGROUND

Increasingly machines for the preparation of a beverage are configured to operate using a capsule that comprises a dosage of an ingredient of the beverage, for instance, coffee, tea or soup. During preparation an extraction unit of the machine at least partially extracts the ingredient from the capsule, e.g. by dissolution. Examples of such machines are provided in EP 2393404 A1, EP 2470053 A1, EP 2533672 A1, EP 2509473 A1 EP 2685874 A1. The increased popularity of these machines may be partly attributed to enhanced user convenience compared to a conventional beverage preparation machine, e.g. a stove-top espresso maker or a manually operated cafetiére (french press). It may also be partly attributed to an enhanced brewing process of the machine, wherein: the capsule is inserted into a extraction unit; heated water is injected into an inlet made in the capsule; the ingredient within the capsule is extracted by the heated water through an outlet made in the capsule; a brewed beverage is collected from the outlet heated water. During this process operational parameters of the machine can be tailored to the specific capsule and/or ingredients therein to enhance the taste of the beverage. For example, the operational parameters may comprise: water temperature at inlet and outlet; pre-wetting duration; water flow rate; water quantity; parameters relating to other operations during the brewing process. In this way the brewing process is optimised.

The said beverage machines are required to fit generally on a kitchen worktop where space is limited. US 2013213238 discloses a beverage preparation machine wherein a module comprising a reservoir is slidably connected about an ark to a brewing module. Accordingly the position of the reservoir module can be reconfigured to adapt the beverage preparation machine to fit in several different spaces. A drawback is that the overall footprint of the beverage preparation machine cannot be substantially changed.

EP 1 267687 discloses a beverage preparation machine wherein the reservoir is pivotably attached as a part thereof, such that it can be pivoted to a re-filling position. A drawback is that the footprint in an operating position cannot be changed.

EP 1864598 discloses a beverage preparation machine which comprises a modular assembly of components which may be added to increase the functionality of said machine. A drawback is that the footprint of the machine cannot be substantially altered when adding said components.

SUMMARY OF THE INVENTION

An object of the invention is to provide a beverage preparation machine that can be reconfigured to fit compactly into numerous locations on a worktop of a user.

It would be advantageous to provide a beverage preparation machine that can be conventional reconfigured.

It would be advantageous to provide a beverage preparation machine that has a desirable aesthetic appearance.

It would be advantageous to provide a beverage preparation machine that is cost-effective.

It would be advantageous to provide a beverage preparation machine that is convenient to manufacture.

It would be advantageous to provide a beverage preparation machine that is robust and reliable.

It would be advantageous to provide a beverage preparation machine that is convenient to service.

Objects of the invention are achieved by the beverage preparation machine according to claims 1 and 14 and the method according to claim 15.

Disclosed herein according to a first aspect of the invention is provided a beverage preparation machine comprising: a beverage preparation module comprising an extraction unit to extract an ingredient of a beverage from capsule supplied thereto or an ingredient container which is part thereof; a fluid supply comprising the components a fluid heater, a fluid pump, optionally a fluid reservoir; a first module movably connected to the beverage preparation module; wherein the beverage preparation machine further comprises a second module movably connected to the first module, the first module comprising the fluid pump and/or the fluid heater, the second module comprising the said components of the fluid supply different to those of the first module, the components comprising at least one of the fluid pump or fluid heater or fluid reservoir.

Accordingly, objects of the invention are solved since the footprint of the beverage machine can be substantially altered by moving the first and second module, e.g. all of the modules can be arranged to the left or right of the beverage preparation module, or in-line.

Advantageously, since the modules comprise various primary components of the beverage preparation machine, in the event of a failure of a primary component (such as the fluid heater or pump) the said module can be conveniently replaced without replacement of the entire beverage preparation machine. In this way the beverage preparation machine is convenient to service.

The beverage preparation module, first module and second modules are generally arranged in a series configuration and are in fluid communication with each other. A said module generally comprises a housing for housing the said components of the module.

In an example wherein the beverage preparation machine is configured with an ingredient container rather that a capsule extraction unit: a pre-portioned amount of the ingredient can be processed from the ingredient container during a beverage preparation operation. Such a system is disclosed in WO 2013014142, which is incorporated herein by reference.

The beverage preparation machine preferably comprises a third module, which is preferably movably connected to the second module (hence the modules have a series arrangement) but may alternatively be preferably movably connected first module (hence the modules are partially arranged in series). Alternatively, the third module may be rigidly connected to the said second or first module, e.g. by means of a rigid connection between the said module and a rigid connection conduit. In an example with a third module, the third module preferably comprises the reservoir, with the first module comprising one of the fluid pump or fluid heater and the second module comprising the other of the fluid pump or fluid heater. Alternatively, the components of the third module can be integrated in the first or second module.

At least one of the aforesaid movable connections is preferably configured to maintain an operative connection between the modules whilst the associated modules are moved between a plurality of positions. That is to say that the beverage preparation machine is fully functional with each of the modules able to interact with each other when in each of said plurality of positions and when being moved between the positions, e.g. a fluid heater and fluid pump in separate modules are maintained in fluidic communication with each other and maintained in electrical communication with the control system.

At least one of the aforesaid movable connections is preferably configured to enable arrangement of the modules in an infinite number of positions. Preferably at least one of the movable connections comprises a permanent connection. That is to say that the connection is not removable, e.g. it is permanently fixed such as via a rivet or requires a particular tool to remove.

Optionally at least one of the said movable connections between the modules may comprise a pivoted connection. A pivot axis of the said pivoted connection (or axis of rotation of a rotatable connection when present) may be substantially vertical when the beverage preparation machine abuts a horizontal support surface. Optionally at least one of the said movable connections between the modules may comprise a flexible connection, which may be achieved by means of a flexible connection conduit (e.g. a hose) connected to a module (e.g. via a nipple or other suitable means). In an example configuration there is: a flexible connection between the beverage preparation module and the first module; a flexible connection between the first module and second module; a rigid connection between the second module and optional third module. Other movable connections are additionally possible such as slideable or rotatable connections, moreover different connections may be combined (e.g. the modules may not all be connected by the same movable connection).

At least one of the first, second or third modules may be elongate. Two or more elongate modules may be arranged with the elongate axis parallel to each other. In this way a desirable aesthetic appearance is achieved. One or more modules may be arranged with the elongate axis parallel to the pivot axis when such a configuration of connection is used.

At least one of the movable connections may comprise a connection conduit, for transmission of fluid between modules. The connection conduit is preferable rigid when a pivoted or rotatable movable connection to a module is used, and is connected to the module in the said manner, e.g. by means of a sleeve arranged around the connection conduit. The connection conduit is preferably flexible in the example of a flexible connection. Advantageously, the beverage preparation machine is economical to manufacture and assemble since the connection conduits to transmit fluid are integrated as part of the movable connection, i.e. the structure of the beverage preparation machine. At least one connection conduit may be arranged to form an abutment for supporting the beverage preparation machine on a support surface.

At least one of the modules may comprise at a bottom surface (i.e. a surface proximal a support surface to support the beverage preparation machine) thereof one of a connection conduit to inlet fluid into the module or to outlet fluid from the module. The said module may also at a top surface (i.e. a surface distal a support surface to support the beverage preparation machine) thereof the other of the connection conduit to inlet fluid into the module or to outlet fluid from the module. Advantageously, with the connection conduits arranged in this manner fluid can efficiently flow straight through a module. Alternatively, the connection conduits may be arranged elsewhere on the module, e.g. both on the same surface (e.g. the top, bottom or on the side), with such a configuration a base of the module may abut the support surface.

Electrical communication means may extend through one of more of the connection conduits, e.g. electrical conductors to enable communication between the fluid pump, fluid heater and other parts of the control systems. The connection conduit may also comprises a separate interior fluid transmission conduit for transmission of fluid.

The extraction unit of the beverage preparation module when configured to extract an ingredient from a capsule may comprise: a capsule holder operable to move between a capsule receiving position and a capsule extraction position; a capsule holder loading system operable to actuate the capsule holder between the said positions, the capsule holder loading system comprising an actuator unit and a loading mechanism, the actuator unit to actuate the loading mechanism, wherein the loading mechanism comprises a planetary gear train and a linear actuator, the actuator unit to supply a rotary motion to the planetary gear train, the planetary gear train to gear down the said rotary motion, the linear actuator to: receive the said geared down rotary motion; convert the geared down rotary motion into linear motion; couple the said linear motion to the capsule holder, wherein the modules are elongate with substantially the same cross-sectional shape. The said coupled linear motion displaces linearly a movable portion of the capsule holder, wherein the movable portion moves relative to a body of the beverage preparation machine and can for example be a cavity or an extraction wall of the capsule holder.

Accordingly, objectives of the invention are solved since the extraction unit is compact as a planetary gear train has a high power density, low efficiency loss and high torque density, particularly in comparison to a parallel axis gear train and other such gear trains.

The modules preferably have substantially the same appearance, such as a circular cross-section, e.g. two or more of the first, second, third and beverage preparation modules. The diameter of the said circular cross-section may be less than 15 cm or 10 cm or 8 cm and may be greater than 5 cm. Advantageously, the beverage preparation machine can be made to be compact and aesthetically pleasing. Such a dimensional range is made possible by utilising a loading system that comprises a planetary gear system.

The planetary gear train may have a reduction ration of at least 5, or more particularly 5-15. The planetary gear train comprises an epicyclic gear train and an annular gear, the epicyclic gear train comprising: a sun gear; one or more planet gears, typically 3 or 4; a carrier to rotatably support the planet gears circumferentially about the sun gear, the or each planet gears rotatably driven by (e.g. via a gear mesh) the sun gear, the annular gear to extend at least partially around the or each planet gear and rotatably driven (e.g. via a gear mesh) therefrom, the sun gear to receive the said rotary motion from the actuator unit, the annular gear to receive partially geared down rotary motion from the or each planet gear and to output the said geared down rotary motion. The carrier is preferably rotationally constrained with respect to the sun gear and the or each planet gear. However, in an alternate configuration the sun gear may be constrained and the carrier is driven to rotate by the actuator unit.

The actuator unit comprises a motor, which is preferably electrically operated, however it may alternatively be hydraulically or pneumatically operated. The motor is preferably arranged with a rotational axis thereof parallel or coaxial a rotational axis (e.g. the axis of rotation of one of the: sun gear; one or more planet gears; carrier; annular gear) of the planetary drive train. Advantageously, the motor and planetary gear train are compactly arranged in-line with each other. This permits the configuration of a long and thin extraction unit, which is easy to integrate in the beverage preparation machine and is aesthetically pleasing. An example of a said coaxial arrangement is wherein the sun gear is directly connected to a shaft of the motor. An example of a said parallel arrangement is wherein the sun gear is driven via an intermediate gear, which is in turn driven by the motor. The motor may alternatively be arranged at an angle with respect to the said axis, e.g. by means of an intermediate bevelled gear.

The linear actuator may be configured with the said linear motion being parallel to a rotational axis of the planetary gear train (e.g. the axis of rotation of one of the: sun gear; one or more planet gears; carrier; annular gear) and/or the rotational axis of the motor (e.g. the motor shaft). Advantageously, the motor and/or planetary gear train and the linear actuator are compactly arranged in-line with each other. Alternatively the linear motion may be offset to the said rotational axis, e.g. by a bevel gear that transmits rotary motion between the linear actuator and planetary gear train.

The motor is preferably mounted to an assembly comprising one or more of the following: a movable portion (e.g. a cavity or an extraction wall) of the capsule holder; the carrier; a component constrained to one of the aforementioned components. Alternatively it may be mounted to the body of the extraction unit.

The capsule holder loading system may comprise a constraint unit, which is operable to rotationally constrain with respect to a body of the extraction unit and/or to constrain to translate with respect to a body of the extraction unit an assembly comprising one or more of the following: carrier; actuator unit;

movable portion of the capsule holder; a component constrained to one of the aforementioned components. The said translation is preferably aligned to the said linear motion of the actuator. The constraint unit may comprise a first guide member and second guide member, which are complementary in shape to enable the relative translational motion. The first guide member may be a protrusion that is connected to an assembly comprising one or more of the following: a movable portion (e.g. a cavity or an extraction wall) of the capsule holder; the carrier; a component constrained to one of the aforementioned components, the second guide member may be a complimentary slot in the body of the extraction unit or a component connected thereto. More particularly, the second guide member may comprise a slot that extends through a guide member of the linear actuator. Advantageously the said assembly may slide with the linear motion of the linear actuator.

The linear actuator may comprise a rotary member and a guide member, the rotary member to receive the said geared down rotary motion from the planetary gear train (e.g. it is driven by the annular gear via a gear mesh or is formed integrally with the annular gear) and in response to displace axially along the guide member by means of a screw threaded connection to the guide member to thereby generate the said linear motion. Advantageously, the combination of the high reduction ratio of the planetary gear train and threaded connection between the rotary member and guide member results in the movable portion of the capsule holder being movable only by drive from the actuator unit, that is in the capsule extraction position the movable portion is not displaced by hydraulic load during brewing. Moreover due to the friction between these components, the actuator unit does not need to apply a holding torque to retain the movable portion in the said extraction position, thus obviating the need for an expensing electrical motor, i.e. a DC step motor with a high holding torque.

In a less preferred example it may comprise a crank driven by the annular gear, the crank driving a connecting linkage to generate the said linear motion. The annular gear of the planetary gear train may be arranged at an inner surface (e.g. it is connected to or formed integrally therewith) of the rotary member (such that the rotary member rotates as part of the annular gear) and an outer surface thereof comprises a male screw thread, an inner surface of the guide member comprising a complimentary female screw thread. Alternatively, the annular gear of the planetary gear train is arranged at an outer surface (e.g. it is connected to or formed integrally therewith) of the rotary member (such that the rotary member rotates as part of the annular gear) and an inner surface thereof comprises a female screw thread, an outer surface of the guide member comprising a complimentary male screw thread. As a further alternative, the annular gear may drive the rotary member e.g. via a meshed coupling, such as a meshed outer surface of the annular gear that cooperates with a meshed outer surface of the rotary member.

The rotary member may be rotatably connected to an assembly comprising one or more of the following: carrier; actuator unit; movable portion of the capsule holder; a component constrained to one of the aforementioned components. The rotational connection can be achieved by the aforesaid component comprising an axle for supporting the rotary member and a rim to axially constrain the rotary member with respect thereto. Advantageously, the capsule holder is isolated from the rotation of the rotary member. Alternatively the capsule holder may be operable to rotate with the rotary member, in such an example the connected between the capsule holder and outlet of the fluid supply can be made to rotate.

In a further alternative, the linear actuator may be configured such that the rotary member and associated components remain translational stationary with respect to the body of the extraction unit, with the guide member being caused to displace relative thereto (e.g. by means of cooperating guides) to transfer the said linear motion to the capsule holder. In such an example the motor and carrier remain stationary with respect to the body as the rotary member is driven to rotate.

An outlet conduit of a fluid supply may extend to an injector of the capsule holder (e.g. the injector is arranged on the movable portion of the capsule holder) though at least part of a rotary member of the linear actuator and/or the planetary gear train. The outlet conduit may be connected to the carrier of the planetary gear train. The conduit may comprise a flexible portion to flexibly displace as the capsule holder moves between the said positions. Alternately the outlet conduit is arranged with another configuration, e.g. the injector is arranged on a stationary portion of the capsule holder.

Disclosed herein according to a second aspect of the invention is a kit of parts for a beverage preparation machine comprising a beverage preparation module, a first module, a second module, an optional third module, according to any feature of the first aspect.

Disclosed herein according to a third aspect of the invention is a method of reconfiguring the arrangement of a beverage preparation machine according to any feature of the first aspect, the method comprising moving at least one of the said modules relative the brewing module.

Disclosed herein according to a fourth aspect of the invention is a method of assembling a beverage preparation machine according to any feature of the first aspect, the method comprising: forming a movable connection between the first module and the beverage preparation module, the movable connection comprising a first connection conduit movably attached to and interconnecting (e.g. to enable fluid communication therebetween) the first module and the beverage preparation module. The method may further comprise forming a movable connection between the first module and the second module, the movable connection comprising a second connection conduit movably attached to and interconnecting the first module and the second module.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF EXEMPLARY EMBODIMENTS

Beverage Preparation System

Figure 1:
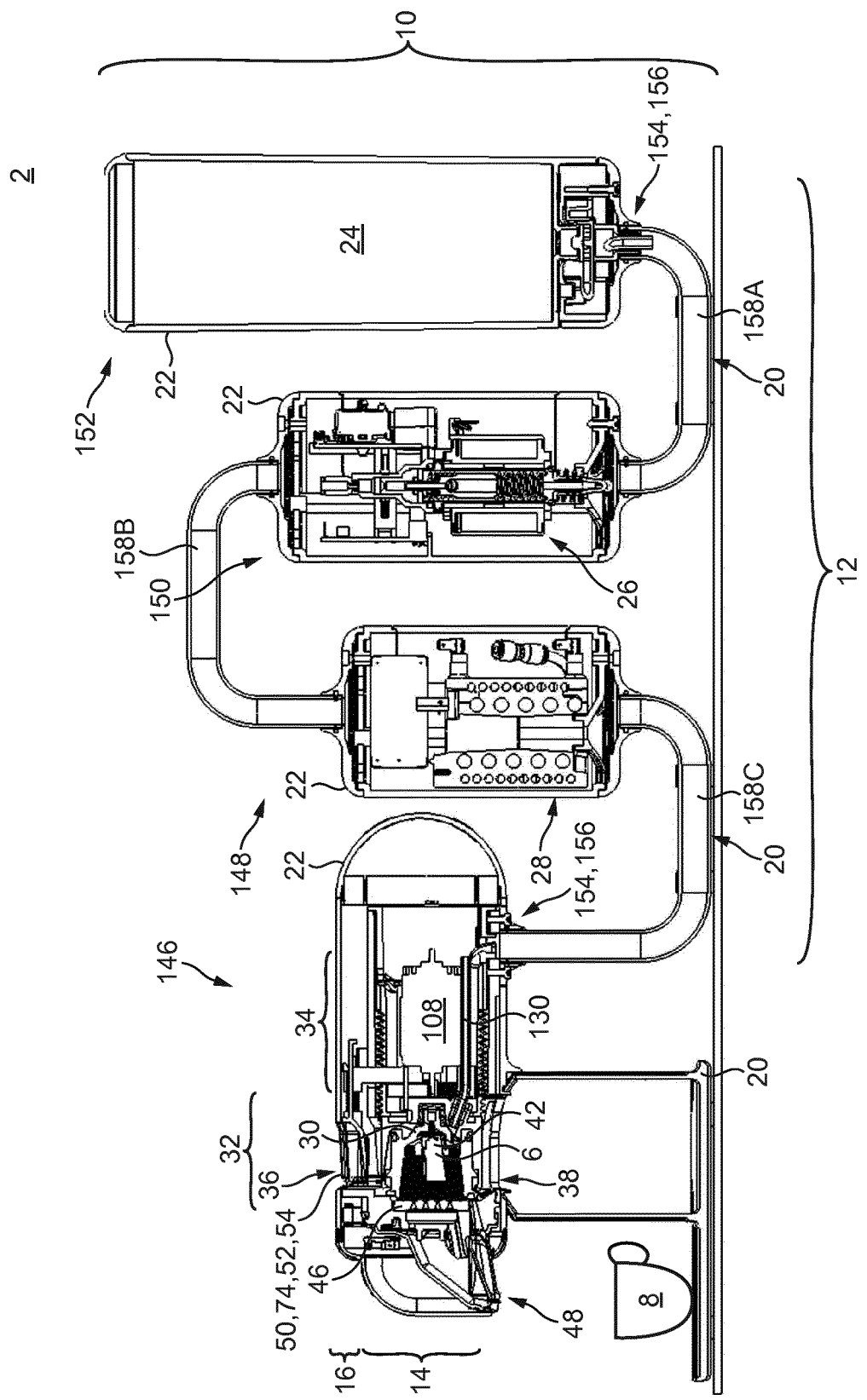
FIG. 1 is a left side view of a general beverage preparation machine, a capsule and a receptacle of a beverage preparation system.

FIG. 1 shows an illustrative view of part of a beverage preparation system 2, which comprises at a first level: a beverage preparation machine 4; a capsule 6; a receptacle 8.

Beverage Preparation Machine

With further reference to FIG. 1, initially the beverage preparation machine 4 will be described. Functionally, the beverage preparation machine 4 is operable to extract one or more ingredients from the capsule 6 by means of the injection of fluid in to the capsule, whereby the extracted ingredient forms at least part of a beverage collected in the receptacle 8 (e.g. a cup). The beverage preparation machine 4 may be dimensioned for use on a work top, i.e. it is less than 50 cm in length, width and height or to operate as part of a freestanding unit. Examples of suitable beverage preparation machines 4 are disclosed in EP 2393404 A1, EP 2470053 A1, EP 2533672 A1, EP 2509473 A1 EP 2685874 A1, all of which are incorporated herein by reference. For completeness such a beverage preparation machine 4 will now be described in more detail, and can be considered to comprise at a first level of the beverage preparation machine 4: a support structure 10; a fluid supply 12; an extraction unit 14; optionally a capsule processing unit 16; a control system 18. These components will now be sequentially described:

Support Structure of Beverage Preparation Machine

The support structure 10 houses and supports the aforementioned first level components and comprises at a second level of the beverage preparation machine 4: a base 20 and a body 22. The base 20 being for abutment with a support surface. The body 22 being for mounting thereto the other first level components. The support structure comprises a plurality of discrete interconnected modules that house the said components, as will be discussed in more detail later on.

Fluid Supply of Beverage Preparation Machine

The fluid supply 12 is operable to supply fluid, which is in general water that is heated, to the extraction unit 14. The fluid supply 12 typically comprises at a second level of the beverage preparation machine 4: a reservoir 24 for containing fluid, which in most applications is 1-2 litres of fluid; a fluid pump 26, such as a reciprocating or rotary pump; a fluid heater 28, which generally comprises a thermo block type heater; an outlet for supplying the fluid to the extraction unit 14, which will be discussed. The reservoir 24, fluid pump 26, fluid heater 28, and outlet are in fluid communication with each other in any suitable order. In an alternative example the fluid supply 12 may comprise a connection to an external fluid source e.g. a water main.

Extraction Unit of Beverage Preparation Machine

Figure 2:
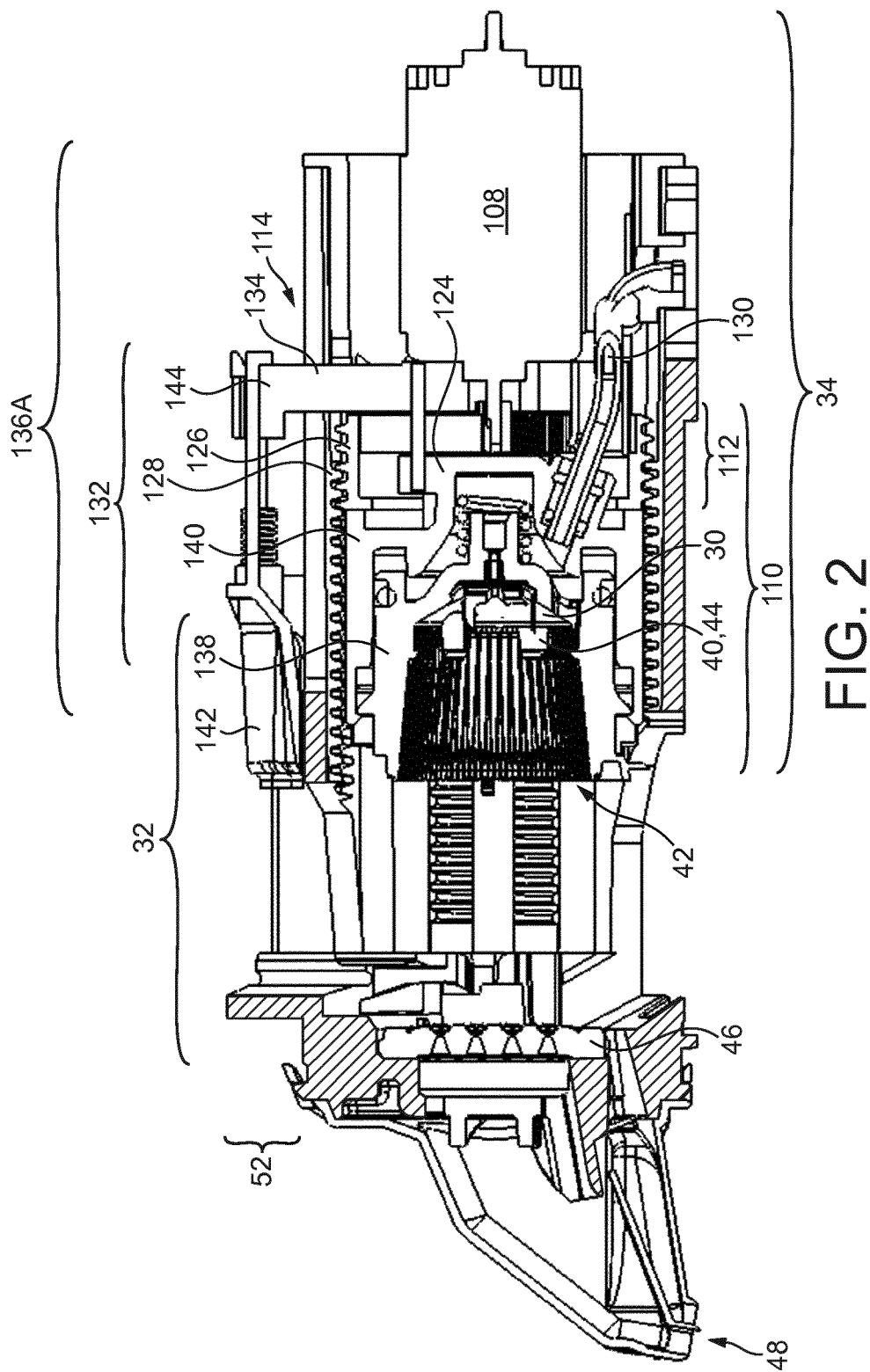
FIG. 2 is a left side view of an operational state of an extraction unit of a general beverage preparation machine.
Figure 3:
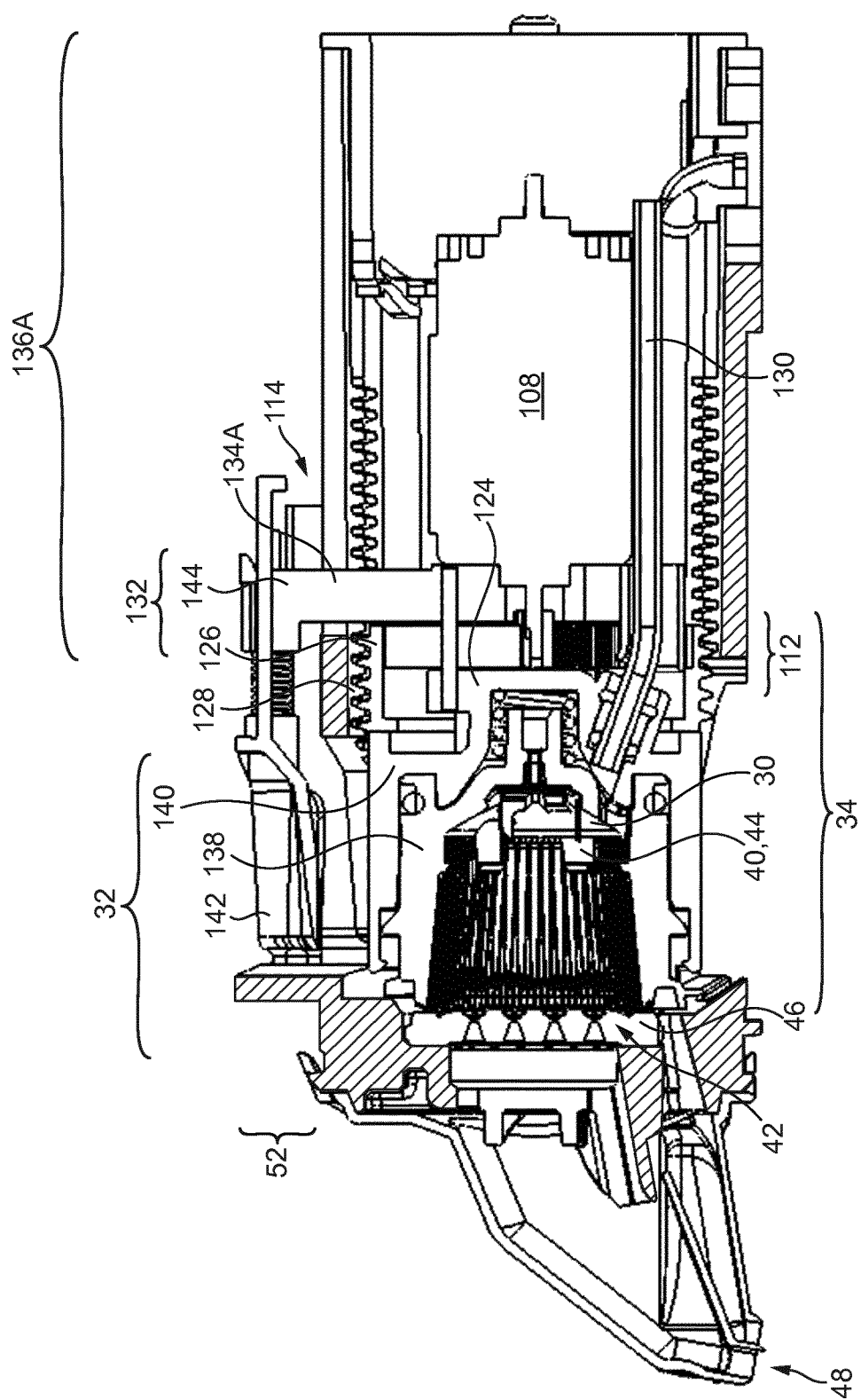
FIG. 3 is a left side view of a further operational state of an extraction unit of a general beverage preparation machine.

Referring to FIGS. 1-3, the extraction unit 14 is operable to receive and process the capsule 6 to extract an ingredient therefrom. The extraction unit 14 can be arranged to receive the capsule 6 directly from a user, or to receive the capsule 6 from the optional capsule processing unit 16. The extraction unit 14 is operable to move between a capsule receiving position (FIG. 2) and a capsule extraction position (FIG. 3), when moving from the capsule receiving position to the capsule extraction position, the extraction unit may be moved through or to a capsule ejection position, wherein a spent capsule can be ejected therefrom. The extraction unit typically comprises at a second level of the beverage preparation machine 4: an injection head 30; a capsule holder 32; a capsule holder loading system 34; a capsule insertion channel 36; a capsule ejection channel 38, which are sequentially described:

The injection head 30 is configured to inject fluid into a cavity of the capsule 6 when held by the capsule holder 32, and to this end has mounted thereto an injector 40, which has a nozzle that is in fluid communication with the outlet of the fluid supply 12. The injection head 30 generally comprises a lance, blade or other suitable member, with the injector 40 extending therethrough or in operational proximity thereto, for perforation of the capsule 6 to form an inlet to the said cavity.

The capsule holder 32 is configured to hold the capsule during extraction and to this end it is operatively linked to the injection head 30. The capsule holder 32 is operable to move to implement the said capsule receiving position and capsule extraction position: with the capsule holder 32 in the capsule receiving position (as shown in FIG. 1) a capsule 6 can be supplied to the capsule holder 32 from the capsule insertion channel 36; with the capsule holder 32 in the capsule extraction position a supplied capsule is held by the holder, the injection head 30 can inject fluid into the cavity of the held capsule, and one or more ingredients can be extracted therefrom. When moving the capsule holder 32 from the capsule extraction position to the capsule receiving position, the capsule holder 32 can be moved through or to the said capsule ejection position, wherein a spent capsule can be ejected from the capsule holder 32 via the capsule ejection channel 38. The capsule holder 32 generally comprises: a cavity 42 with a cavity base 44 comprising the injection head 30 mounted thereto; an extraction wall 46 having an outlet 48 for the extracted ingredients. To implement the said capsule receiving and the capsule extraction positions the extraction wall 46 and cavity 42 can be moveable relative to each other, e.g. the extraction wall 46 is fixed to the body 22 and the cavity 42 is movable relative thereto. In another example the cavity can be fixed to the extraction wall and to implement the capsule receiving and capsule extraction positions the injection head and base of the cavity are movable relative the cavity: an example of such a system is provided in WO 2009/113035, which is incorporated herein by reference.

The capsule holder loading system 34 is operable to drive the capsule holder 32 between the said capsule receiving position and the capsule extraction position. To this end the capsule holder loading system 34 typically comprises an actuator and actuator mechanism as will be discussed.

The extraction unit 14 can operate by means of injection of fluid at pressure into the cavity of the capsule 6, e.g. at up to 20 bar, which can be achieved by means of the injection head 30 and pump 26, as in the illustrated example. It may alternatively operate by centrifugation as disclosed in EP 2594171 A1, which is incorporated herein by reference. In the example of the latter the extraction unit 14 further comprises a capsule drive mechanism, which typically comprises an electric motor and drive train, configured to rotate a capsule support to effect the said centrifugation.

Capsule Processing Unit of Beverage Preparation Machine

The beverage preparation machine 4 may comprise a capsule processing unit 16. The capsule processing unit 16 is operable to process a capsule 6 to: detect its supply by a user; optionally identify a type of the capsule 6; optionally read a code of the capsule; transfer the capsule 6 to the extraction unit 14. Generally, the capsule processing unit 16 is arranged above the extraction unit 14 and is integrated as part of the body 22 of the beverage preparation machine 4 with its various sub components attached thereto. The capsule processing unit 16 comprises at a second level of the beverage preparation machine 4: optionally a code reading system 50; a capsule transfer mechanism 52; a capsule detection system 54, which are sequentially described:

The code reading system 50 is operable to read a code of the capsule 6 to generate therefrom a code signal. The code signal can be processed by the processing unit (discussed later on) of the control system 18 to determine extraction information. The extraction information encoded by the code relates to the capsule and/or operational parameters of the machine that may be used during the extraction process. For example, the extraction information may encode one or more of the following: angular velocity/acceleration (for centrifugally operated extraction units); water temperature (at capsule inlet and/or machine outlet); water mass/volumetric flow rate; water volume; a sequence of extraction operations e.g. pre-wetting time; capsule parameters (volume, type, capsule identifier, expiry date), which may for example be used to monitor capsule consumption for the purpose of capsule re-ordering.

The code reading system 50 comprises a code reader, which is operable to read a code of the capsule 6. Various code and code reading system 50 configurations may be used, e.g.: an optically readable code and optical reader; an induction based code and an inductive sensor code reader; an RFID tag and interrogating EM field. In code reading system 50 configurations wherein the code is read during relative movement between a reading head of the code reader and the code of the capsule 6, the code reading system 50 comprises a code reading mechanism, which is operable to effect the said relative movement. The code reading system 50 may alternatively be integrated in the extraction unit 14, e.g. in a centrifugation based extraction unit 14, a code of the capsule 6 can be read during the rotation of the capsule.

The capsule transfer mechanism 52 is operable to transfer a processed capsule to the extraction unit 14 (i.e. via the capsule insertion channel 36). Accordingly, it is generally arranged discrete from and above the extraction unit 14. The capsule transfer mechanism 52 effects transfer of a capsule by removal of a constraint constraining the capsule 6 or by displacement of the capsule to the capsule insertion channel 36. In general the capsule transfer mechanism 52 comprises a movable capsule support that is arranged to receive a capsule 6 from a user and is movable relative the body 22, to effect transfer of a capsule supported thereon to the extraction unit 14. More particularly, it is movable between a capsule support position and a capsule transfer position, wherein: when in the capsule support position (as shown in FIG. 1) the code of the capsule 6 can be read by the code reading system 50; when in the capsule transfer position transfer of a supported capsule 6 is effected to the extraction unit 14. The movable capsule support is driven between the positions by means of the capsule support drive mechanism, which is in turn driven by an actuator unit. Examples of suitable capsule transfer mechanisms are disclosed in WO 2014/056642 and EP14176243.5, which are incorporated herein by reference.

The capsule detection system 54 is operable to detect the presence, and optionally a type of capsule 6 on the movable capsule support of the capsule transfer mechanism 52. The capsule detection system comprises one or more capsule detection sensors to detect the presence of a capsule in proximity thereto. The capsule detection sensors are operable to generate a capsule detection signal that is processed by the processing unit (discussed later on) of the control system 18. The or each capsule detection sensor can be of various configurations, e.g.: inductive sensors; optical sensors; mechanically actuated sensors.

Control System of Beverage Preparation Machine

Figure 4:
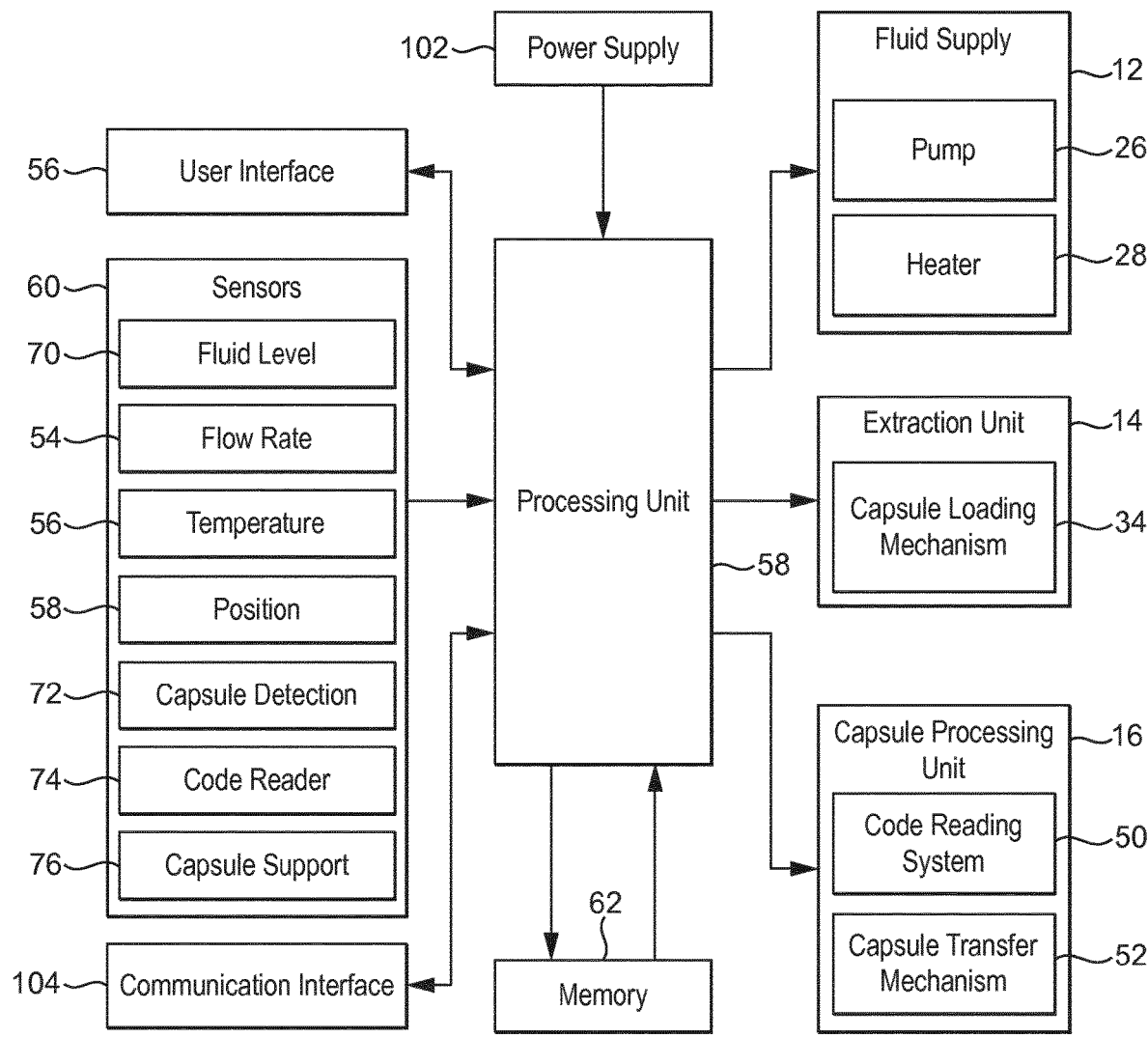
FIG. 4 is a schematic diagram of a control system of the general beverage preparation machine according to FIG. 1.

With reference to FIG. 4, the control system 18 will now be considered: the control system 18 is operable to control the other first level components to extract the one or more ingredients from the capsule 6. The control system 18 typically comprises at a second level of the beverage preparation machine 4: a user interface 56; a processing unit 58; optionally sensors 60; a power supply 102; optionally a communication interface 104, which are sequentially described:

The user interface 56 comprises hardware to enable a user to interface with the processing unit 58, by means of a user interface signal. More particularly: the user interface receives commands from a user; the user interface signal transfers the said commands to the processing unit 58 as an input. The commands may, for example, be an instruction to execute an extraction process and/or to adjust an operational parameter of the beverage preparation machine 4 and/or to power on or off the beverage preparation machine 4. The processing unit 58 may also output feedback to the user interface 56 as part of the beverage preparation process, e.g. to indicate the beverage preparation process has been initiated or that a parameter associated with the process has been selected.

The hardware of the user interface 56 may comprise any suitable device(s), for example, the hardware comprises one or more of the following: buttons, such as a joystick button or press button; joystick; LEDs; graphic or character LDCs; graphical screen with touch sensing and/or screen edge buttons. The user interface 56 can be formed as one unit or a plurality of discrete units. For more complicated hardware configurations the user interface 56 can comprise a separate processing unit (examples of which are provided following) to interface with the maser processing unit 58.

The sensors 60 are operable to provide an input signal to the processing unit 58 for monitoring of the extraction process and/or a status of the beverage preparation machine 4. The input signal can be an analogue or digital signal. The sensors 60 typically comprise one or more of the following: fluid level sensors 62 associated with the reservoir 24; flow rate sensors 64 associated with the fluid pump 26; temperature sensors 66 associated with the heater 28; position sensors 68 associated with the extraction unit 14, which are operable to sense the position of the extraction unit 14, (e.g. the capsule receiving position, capsule extraction position, capsule ejection position); fluid level sensors 70 operable to measure a fluid level in the receptacle 6; capsule detection sensors 72 associated with the capsule processing unit 16; the code reader 74 associated with the code reading system 50; a movable capsule support sensor 76 associated with the capsule transfer mechanism 52; angular velocity sensors (for use with extraction units that operate via centrifugation).

The processing unit 58 is operable to: receive an input, i.e. the commands from the user interface 56 and/or the signal of the sensors 60 (e.g. the capsule detection sensors 72 of the capsule detection system 54); process the input according to program code (or programmed logic) stored on a memory unit (discussed later on); provide an output, which is generally an extraction process. More specifically the output comprises the operation of: optionally the capsule processing unit 16 (e.g. operation of the code reading system 50, capsule transfer mechanism 52); the extraction unit 14 (i.e. operation of the capsule holder loading system 34 to drive the capsule holder 32 between the said capsule receiving position and the capsule extraction position); water supply 12 (i.e. operation of the fluid pump 26 and fluid heater 28). Operation of the aforesaid components can be open-loop control, or more preferable closed-loop control using the input signal from the sensors 60 as feedback.

The processing unit 58 generally comprise memory, input and output system components arranged as an integrated circuit, typically as a microprocessor or a microcontroller. The processing unit 50 may comprises other suitable integrated circuits, such as: an ASIC; a programmable logic device such as a PAL, CPLD, FPGA, PSoC; a system on a chip (SoC); an analogue integrated circuit, such as a controller. For such devices, where appropriate, the aforementioned program code can be considered programmed logic or to additionally comprise programmed logic. The processing unit 50 may also comprise one or more of the aforementioned integrated circuits. An example of the later is several integrated circuits is arranged in communication with each other in a modular fashion e.g.: a slave integrated circuit to control the user interface 42 in communication with a master integrated circuit to control the extraction unit 14 and water supply 12.

The processing unit 58 generally comprises a memory unit 62 for storage of instructions as program code and optionally data. To this end the memory unit typically comprises: a non-volatile memory e.g. EPROM, EEPROM or Flash for the storage of program code and operating parameters as instructions; volatile memory (RAM) for temporary data storage. The memory unit may comprise separate and/or integrated (e.g. on a die of the semiconductor) memory. For programmable logic devices the instructions can be stored as programmed logic.

The instructions stored on the memory unit can be idealised as comprising a beverage preparation program. The beverage preparation program can be executed by the processing unit in response to the said input, (i.e. the commands from the user interface 56 and/or the signal of the capsule detection sensors 72). Execution of the beverage production program causes the processing unit 58 to control the following first level components: optionally the capsule processing unit 16 to process a received capsule to the extraction unit 14; the extraction unit 14 to move between the capsule receiving position and the capsule extraction position; water supply 12 to supply heated water to the extraction unit 14. The beverage preparation program can effect control of the said components using extraction information encoded on the code capsule and/or other information that may be stored as data on the memory unit 62 and/or input via the user interface 56.

The power supply 102 is operable to supply electrical energy to the said controlled components, the processing unit 58 and components associated therewith. The power supply 102 may comprise various means, such as a battery or a unit to receive and condition a mains electrical supply. The power supply 102 may be operatively linked to part of the user interface 56 for powering on or off the beverage preparation machine 4.

The communication interface 104 is for data communication of the beverage preparation machine 4 with another device/system, which may be a server system, a capsule dispenser or other related device. The communication interface 104 can be used to supply and/or receive information related to the beverage preparation process, such as capsule consumption information and/or extraction process information. The communication interface 104 may comprise a first and second communication interface for data communication with several devices at once or communication via different media.

The communication interface 104 can be configured for cabled media or wireless media or a combination thereof, e.g.: a wired connection, such as RS-232, USB, I²C, Ethernet define by IEEE 802.3; a wireless connection, such as wireless LAN (e.g. IEEE 802.11) or near field communication (NFC) or a cellular system such as GPRS or GSM. The communication interface 104 interfaces with the processing unit 58, by means of a communication interface signal. Generally the communication interface comprises a separate processing unit (examples of which are provided above) to control communication hardware (e.g an antenna) to interface with the maser processing unit 58. However, less complex configurations can be used e.g. a simple wired connection for serial communication directly with the processing unit 58.

Capsule of Beverage Preparation System

Figure 5:
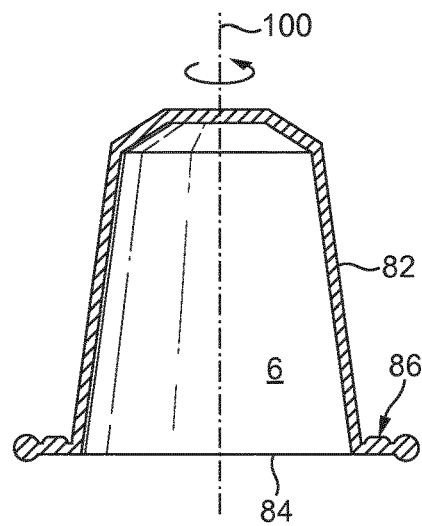
FIG. 5 is a side cross-sectional view of a first embodiment of a capsule of the beverage preparation system according to FIG. 1.

The capsule 6 generally comprises: a body portion defining a cavity for the storage of a dosage of an ingredient to be extracted; a lid portion for closing the cavity; a flange portion for connecting the body portion and flange portion, the flange portion being arranged distal a base of the cavity. The body portion may comprise various shapes, such as a disk, conical or rectangular cross-sectioned shaped. The capsule may be formed from various materials, such as metal or plastic or a combination thereof. In general the material is selected such that it is: food-safe; it can withstand the pressure/temperature of the extraction process; it is perforable to enable insertion of the injector 40 of the injection head 30; it is rupturable for delivery of the extracted ingredient to the outlet 48 of the extraction wall 46. Accordingly, it will be appreciated that the capsule 6 may take various forms, three examples of which are provided in the following:

FIG. 5 shows a side cross-sectional view of a first example of a capsule 6 that comprises: a body portion 82, which comprises a frusto-conically shaped cavity for holding the dosage of the ingredient to be extracted; a lid portion 84 for closing the cavity of the body portion; a flange portion 86 for connection of the body portion 82 and the lid portion 84.

Figure 6:
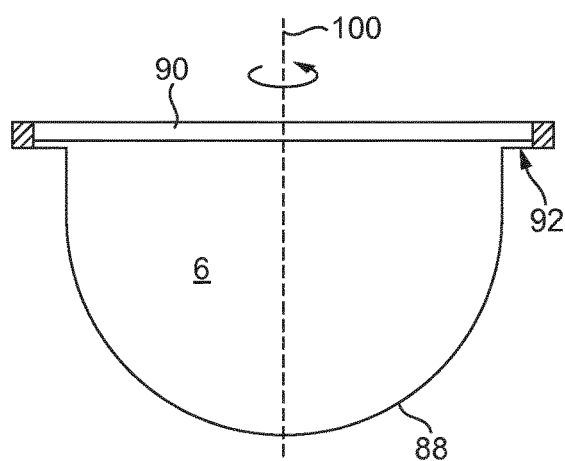
FIG. 6 is a side cross-sectional view of a second embodiment of a capsule of the beverage preparation system according to FIG. 1.

FIG. 6 shows a side cross-sectional view of a second example of a capsule 6 that comprises: a body portion 88, which comprises a hemi-spherically shaped cavity for holding the dosage of the ingredient to be extracted; a lid portion 90 for closing the cavity of the body portion; a flange portion 92 for connection of the body portion 88 and the lid portion 90.

Figure 7:
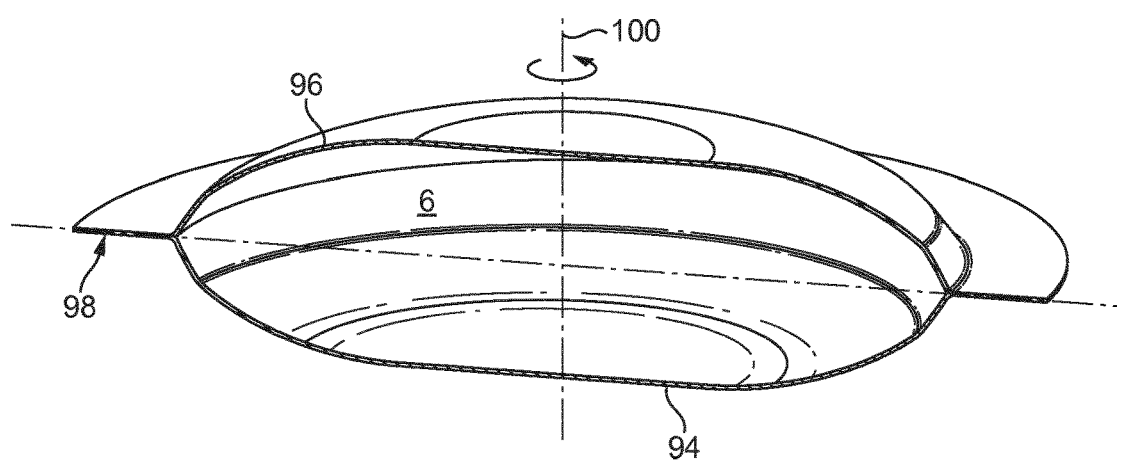
FIG. 7 is a perspective cut-sectional view of a third embodiment of a capsule of the beverage preparation system according to FIG. 1.

FIG. 7 shows a side cross-sectional view of a second example of a capsule 6 that comprises: a body portion 94, which comprises a disc shaped cavity for holding the dosage of the ingredient to be extracted; a lid portion 96, which also comprises a cavity, for closing the cavity of the body portion; a flange portion 98 for connection of the body portion 94 and the lid portion 96.

Generally, the capsule 6 is shaped such that it is substantially rotationally symmetric about a capsule axis of rotation 100 which is extends generally orthogonal to a plane on which the flange portion, 86, 92, 98 is located.

Capsule Holder Loading System

A capsule holder loading system 34 according to an aspect of the invention will now be described in more detail. Referring in particular to FIGS. 2, 3, 8 and 9, the capsule holder loading system 34 comprises an actuator unit 108; a loading mechanism 110; optionally a constraint unit 132, which will be sequentially described.

The actuator unit 108 is operable to actuate the loading mechanism 110, and comprises a rotary actuator to provide rotary motion. Generally the actuator unit 108 comprises an electrically operated motor, however it may also comprise pneumatically and hydraulically operated variants. In the illustrative example the actuator unit 108 generally rotates with an angular velocity of 100-350 radians per second. Generally the actuator unit 108 is mounted to a carrier of the loading mechanism 110, such that it displaces with the carrier as will be discussed.

The loading mechanism 110, when actuated, moves the capsule holder (i.e. a movable portion thereof) between the said positions, and comprises a planetary gear train 112 and a linear actuator 114, which will be sequentially described:

The planetary gear train 112 is configured: to receive the said rotary motion from the actuator unit 108; generate therefrom geared down the received rotary motion, with a reduction ratio of about 8-12; supply the said geared down rotary motion to the linear actuator 114. The planetary gear train 112 comprises an epicyclic gear train 116 and an annular gear 118, which will be sequentially described:

The epicyclic gear train 116 comprises: a sun gear 120; one or more planet gears 122; a carrier 124. The sun gear 120 receives the said rotary motion from the actuator unit 108. The planet gears 122 are circumferentially disposed about a rotational axis of the sun gear 120. The carrier 124 rotatably supports and connects the one or more planet gears 122 to the sun gear 120. The carrier 124 is preferably held stationary with respect to the sun gear and the one or more planet gears, e.g. in the illustrative example it is rotationally constrained with respect to the body 22 as will be discussed. Moreover, in the illustrative example there are three planet gears 122, however there may be another suitable number such as four or five. The planet and sun gears are correspondingly meshed for transmission of the said rotary motion from the sun gear 120 to the one or more planet gears 122. Typically the reduction ratio is about 2-6, in the illustrative example it is 4.3.

The annular gear 118 is arranged such that the planet gears 122 roll within the pitch circle thereof and is correspondingly meshed for transmission of the said rotary motion from the planet gears 122. Typically the reduction ratio is about 1-3, in the illustrative example it is 2.2. Hence in the illustrative example the overall reduction ration of the planetary gear train 112 is 9.7.

The sun gear 120, a carrier 124 and annular gear 118 are generally co-axially arranged. The axis of the gears are generally parallel, however they can also be arranged at an angle. The illustrative example shows a simple planetary gear train 112, however other planetary configurations may be used, such as a compound planetary gear train, including a meshed-planet, stepped-planet and a multi-stage planet. Advantageously, the planetary gear train 112 provides a high power density, low efficiency loss and high torque density, particularly in comparison to a parallel axis gear train and other such gear trains.

The linear actuator 114 is operable to receive the said geared down rotary motion from the planetary gear train 112; generate therefrom linear motion; couple the linear motion to a movable portion of the capsule holder 32 to effect its displacement between the said positions. Various linear actuators may be used, such as: a cam actuator; crank and connecting linkage actuator; a screw actuator, including a lead screw, screw jack, ball screw and roller screw.

In the illustrated the example the linear actuator 114 comprises a lead screw linear actuator with a rotary member 126 and a guide member 128, wherein the rotary member 126 is configured to move along the guide member 128 to provide the said linear motion. In more detail, the rotary member 126 and guide member 128 are coaxially arranged with the rotary member positioned within the guide member 128. The rotary member 126 comprises at an outer periphery thereof, and perpendicular its axis of rotation, a male screw thread. The guide member 128 comprises at an interior thereof a complimentary female screw thread. The said threads are configured such that rotation of the rotary member relative the guide member 128 effects the said linear motion in the coaxial direction.

The rotary member 126 is annular in shape and is connected to the annular gear 118 of the planetary gear train 112, which is arranged at an interior thereof. Accordingly, the said geared down rotary motion of the annular gear 118 is transmitted to the linear actuator 114 via the rotary member 126 and is converted to the said linear motion by the threaded engagement between the rotary member 126 and guide member 128.

In the illustrated example the movable portion of the capsule holder is the cavity 42 thereof, which is operatively connected to the rotary member 126 to receive therefrom the said linear motion. In particular it may be rotatably connected to the rotary member 126 but axially constrained with respect thereto. In this way it can remain rotationally stationary as the rotary member 126 rotates relative thereto but displace axially with the rotary member 126. Accordingly, the capsule cavity 42 may comprise an axle for rotatably mounting the rotary member 126, whereby the axle comprises a rim for axial constraint.

Figure 8:
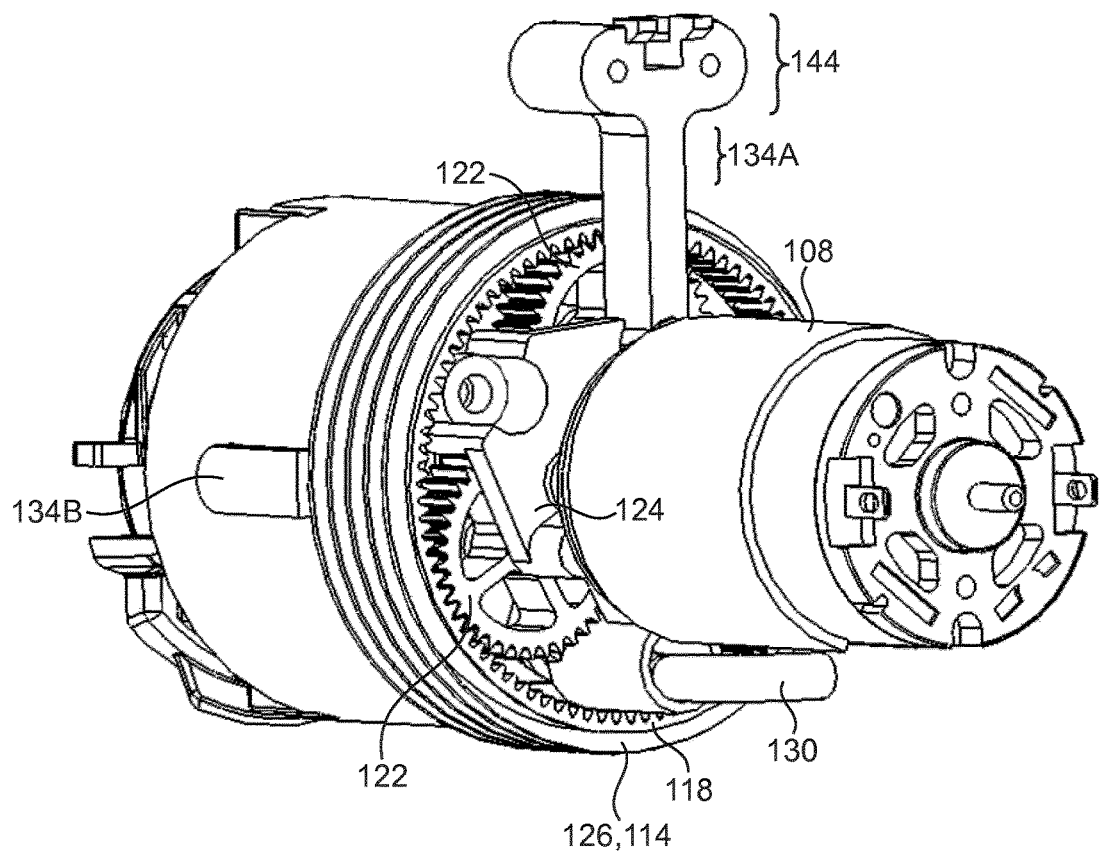
FIG. 8 is a perspective view of a loading system of the extraction unit of FIG. 2.
Figure 9:
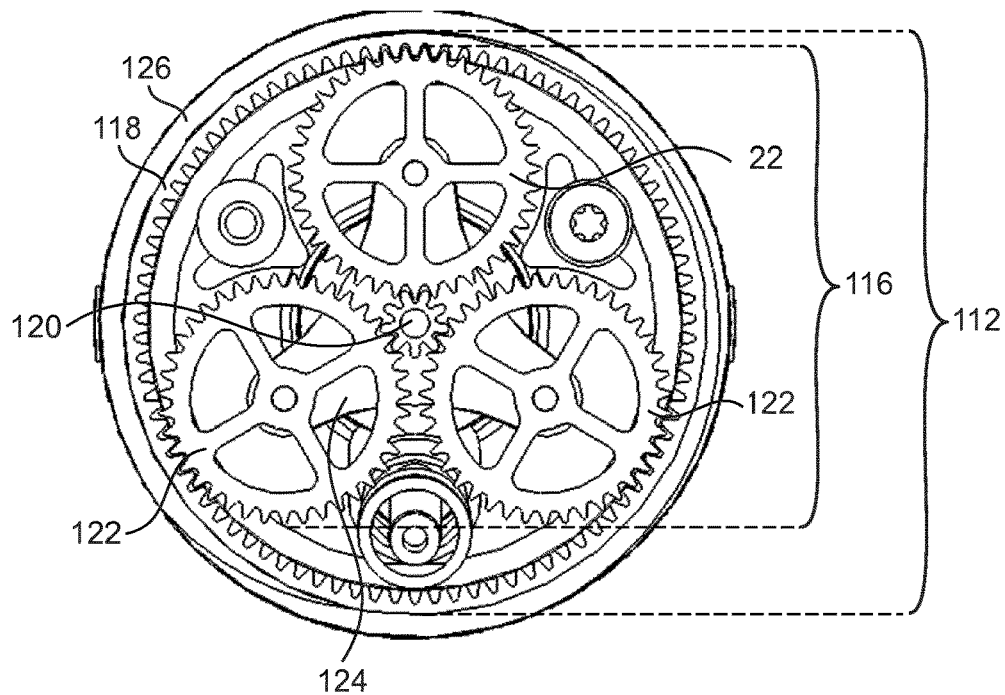
FIG. 9 is a front view of a loading system of the extraction unit of FIG. 2.
Figure 10:
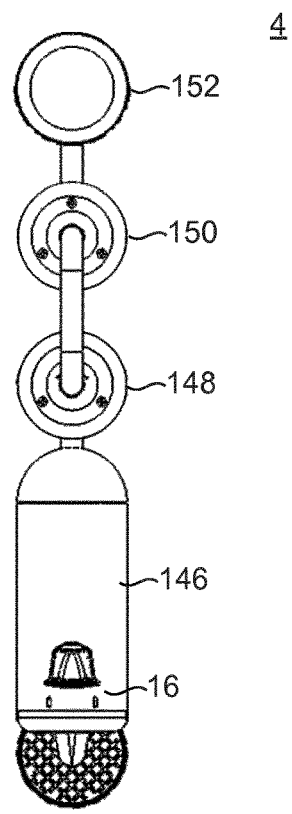
FIG. 10 is a top view of the beverage preparation machine of FIG. 1.
Figure 11:
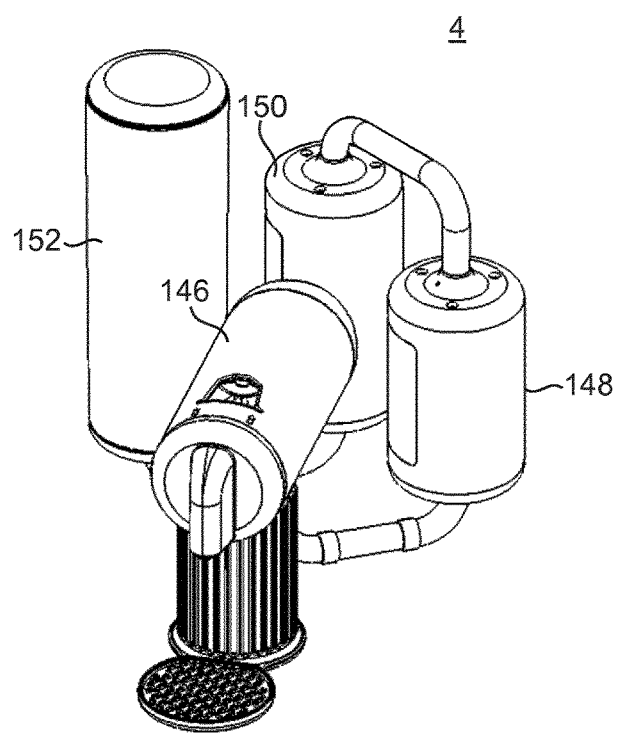
FIG. 11 is a perspective front elevated view of the beverage preparation machine of FIG. 1 when arranged with an alternative configuration.
Figure 12:
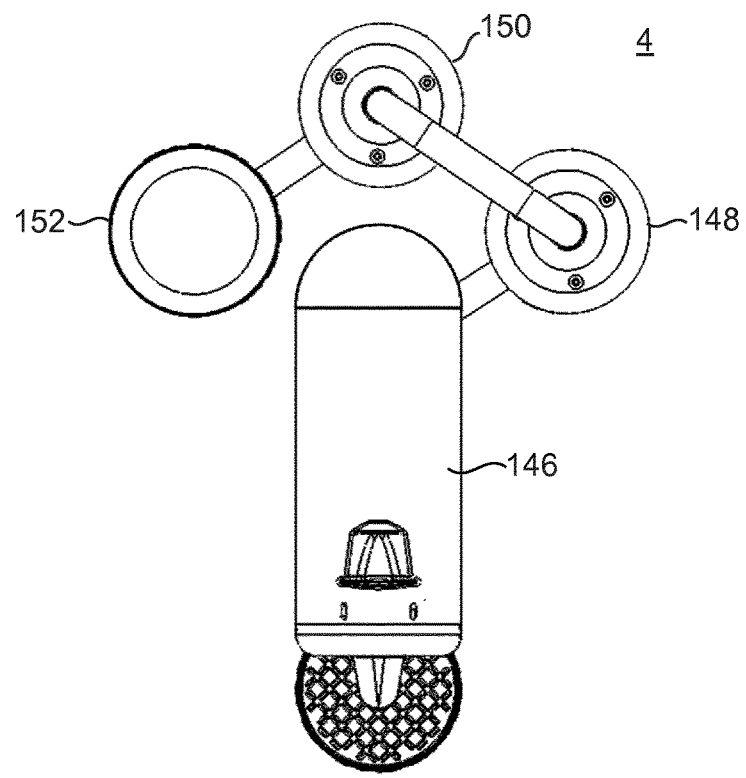
FIG. 12 is a top view of the beverage preparation machine of FIG. 11.
Figure 13:
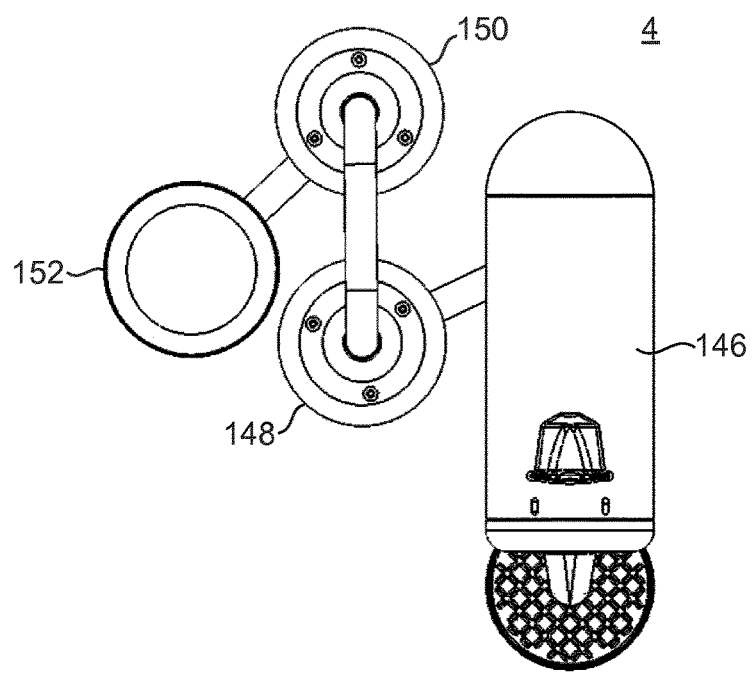
FIG. 13 is a top view of the beverage preparation machine of FIG. 1 when arranged with an alternative configuration.

The constraint unit 132 is operable to: rotationally constrain the cavity 42, carrier 124, and other associated components that may be attached thereto (e.g. the actuator unit 108) with respect to the body 22 about the axis of rotation of the planetary gear train 112, i.e. the axis of rotation of the annular gear 118; enable axial displacement of the carrier 124 and cavity 42 and the other associated components. The said operation is generally achieved by a first guide connected to the cavity 42/carrier 124 and complimentary second guide attached to the body 22, which are translatably displaceable relative to each other. Generally one of the guides comprises a channel or slot and the other of the guides comprises a protrusion shaped to be slidably received by the channel. In the illustrated example the constraint unit is in several parts, as best seen in FIGS. 8 and 2: a first guide comprises a protrusion 134A extending from the carrier and the second guide comprises a complimentary slot 136A along which the protrusion 134A is slideable; a first guide comprises two protrusions 134B (only one of which is shown) extending from the either side of the cavity 42 and the second guide comprises a complimentary slot (not shown) along which the protrusion 134B is slideable. Whilst the illustrated example shows both parts, it will be appreciated that one may be utilised without the other, or that other suitable configurations may be utilised.

As shown in the illustrated example it is advantageous for the capsule holder 32 to remain rotationally stationary during movement between its said positions since the injector 30 of the capsule holder 32 receives fluid from the outlet of the fluid supply 12: a less complex connection between the fluid supply 12 and injector 30 is therefore possible. In the illustrative example, as best seen in FIGS. 2, 3 and 5, since the carrier 124 also remains stationary, an outlet conduit 130 of the fluid supply 12 can extend therethrough and be supported by the carrier 124, together with simultaneously extending through the rotary member 126. To enable the outlet conduit 130 to displace axially with the injector 30, the conduit may comprise a flexible portion, such as a flexible tube made from rubber or plastic that may be arranged with a U-shape, a coil or other suitable arrangement.

Referring to FIGS. 2 and 3 in particular, the cavity 42 of the capsule holder 32 may comprise a hydraulically actuated portion 138 and a fluid supply portion 140, which are operable to displace relative to each other to effect enhanced sealing of the capsule 6 and the extraction wall 46. In more detail, the hydraulically actuated portion 138 comprises the cavity for holding the capsule 6 and is arranged within a sealed further cavity of the hydraulically actuated portion 140. A region defined by the sealed cavity is configured to receive the pressurised fluid from the fluid supply 12 during a beverage preparation process, to effect displacement of the hydraulically actuated portion 138 relative the fluid supply portion 140 towards the extraction wall 46. A periphery of the hydraulically actuated portion 138 is thereby effected to exert a sealing pressure against an bottomside of the flange 86, 92, 98 of the capsule, whereby the topside of the flange is pressed against the extraction wall 46. Such an arrangement is disclosed in WO 2008/037642 and in WO 2009/115474, both of which are incorporated herein by reference.

The capsule processing unit 16 may be operatively linked to the capsule holder loading system 34, such that the movable capsule support 142 of the capsule transfer mechanism 52 thereof is moved as the capsule holder 32 is displaced between the said positions, e.g.: as the capsule holder 32 is moved to the capsule receiving position the movable capsule support is moved to a capsule transfer position to allow a capsule supported thereon to be transferred to the capsule insertion channel 36 or a capsule to be inserted by a user into the insertion channel 36; as the capsule holder 32 is moved to the capsule holding position the movable capsule support is moved to a capsule supporting position wherein access by a capsule 6 to the insertion channel 36 is prevented.

The said operability can be achieved by arranging the cavity 42 of the capsule holder 32, or a component connected thereto, to engage with the movable capsule support 142 to transfer the said linear motion thereto. In the illustrative example, the capsule transfer mechanism 52 further comprises a motion transmission member 144, which is connected to the carrier 124, and extends beyond the complimentary slot 136 of the constraint unit 132 to slidably engage the movable capsule support 142 via an optional spring. The movable capsule support 142 is constrained to translate with respect to the body 22, e.g. by co-operating channels.

Support Structure of Beverage Preparation Machine

A support structure 10 according to an aspect of the invention will now be described in more detail. Referring in particular to FIGS. 1, 10-13, the support structure 10 comprises a: brewing module 146;

first module 148; second module 150; optionally a third module 152, which are movable attached in series with each other. The said modules house the aforesaid first level components of the beverage preparation machine 4, in various optional configurations as will be discussed. As shown in the referenced figures, a user can selectively configure the beverage preparation machine 4, from a range of possible configurations, to fit various spaces of a user environment. The said modules 146-152 will be sequentially described:

The brewing module 146 houses the extraction unit 14 and generally houses the primary components of the control system 18, such as the processing unit 58 and user interface 56. It may also comprise other optional components, such as the capsule processing unit 16. Generally the extraction unit 14 comprises the aforesaid example with a loading mechanism 110 having a planetary gear train 112 and linear actuator 114, however other type extraction units, such as those incorporated herein by reference, may be utilised. It is preferable for aesthetic reasons as well as manufacturing to utilise the aforesaid extraction unit 14 since the brewing module 146 can be made elongate with substantially the same form as the other modules.

The first module 148 generally houses the fluid heater 28 and/or the fluid pump 26 of the fluid supply 12. Whereas the second module 150 generally houses one of the fluid heater 28 or the fluid pump 26 when the other is housed in the first module 148. In the instance wherein the fluid heater 28 and the fluid pump 26 are both housed in the first module, then the second module houses the reservoir 24 of the fluid supply 12. In an example comprising a third module 152, the reservoir 12 is housed therein and the first module 148 houses one of the fluid heater 28 or the fluid pump 26 and the second module 150 houses the other of the fluid heater 28 or the fluid pump 26. Referring to the example figures, the beverage preparation machine 4 therein comprises a third module 152, with the first module 148 housing the fluid heater 28 and the second module housing the fluid pump 26.

The movable connection between the modules 146, 148, 150, 152 is preferably a pivoted connection, however other variants are possible such as a sliding connection or a flexible connection comprising a flexible conduit connected to a module (e.g. a hose connected to a nipple of a module) or a combination thereof, i.e. different connections between the modules. The pivot axis of the pivoted connection is preferably arranged in the vertical direction when the beverage preparation machine 4 is supported on at horizontal support surface, however other variants are possible, i.e. inclined or horizontal. Referring to the example figures, the beverage preparation machine 4 therein comprises a pivoted connection between the modules whereby the pivot axis is vertically arranged.

One or more of the modules 146, 148, 150, 152 comprise an housing which is preferably substantially the same shape, e.g. they are cylindrical with the same or a similar diameter or are rectangular with the same or a similar cross-section. The modules are generally elongate about an axis that can optionally be aligned to the pivot axis, however one or more of the modules can be aligned in a direction other that of the pivot axis. Referring to the example figures the modules are generally cylindrical with the same diameter, and when the beverage preparation machine 4 is supported on a horizontal support surface: the modules 148, 150 and 152 are vertically arranged coaxial the associated pivot axis and the module 146 is horizontally arranged.

The pivoted connection comprises an axle arranged to rotate relative a sleeve, e.g. the sleeve is arranged on a module and an axle pivots within the sleeve or the converse. The axle may comprise a conduit for the transmission of fluid between the modules. Advantageously, the fluid supply 12 can form part of the movable connection. Referring to the illustrated example, in FIG. 1 the modules comprise the sleeve 154 and the axle 156 is part of a fluid conduit 158 that interconnects the modules.

In more detail, in the example: fluid conduit 158A supplies fluid from the reservoir 24 of the third module 152 to the second module 150; fluid conduit 158B supplies fluid via the fluid pump 26 of the second module 150 to the first module 148; fluid conduit 158C supplies fluid via the fluid heater 28 of the first module 148 to the beverage preparation module 146.

One or more of the fluid conduits 158 can be arranged to abut the support surface, thereby forming part of the base 20. In the illustrated example, conduits 158A and 158C are U-shaped for abutment, although it will be appreciated that other shapes are possible. For modules that have a fluid inlet and outlet (in the example the first 148 and second module 150) the inlet and outlet can be arranged generally on opposed surfaces thereof, e.g. in the illustrated example the second module 150 has at a bottom surface a fluid inlet and at a top surface a fluid outlet, whereas the first module 148 has the converse arrangement. Advantageously, fluid is able to flow directly through a module. The one or more of the fluid conduits 158 may also comprise part of the control system 18 extending therethrough (e.g. electrical wiring for the transmission of signals and power) for communication between the modules.

LIST OF REFERENCES

2 Beverage preparation system
4 Beverage preparation machine
   10 Support structure
      146 Beverage preparation module
         20 Base
         22 Body
      148 First module
         20 Base
         22 Body
      150 Second module
         20 Base
         22 Body
      152 Third module
         20 Base
         22 Body
      Movable connection
         154 Sleeve
         156 Axle
   158 Connection (fluid) conduit
   12 Fluid supply
      24 Reservoir
      26 Fluid pump
      28 Fluid heater
      130 Outlet conduit
   14 Extraction unit
      30 Injection head
         40 Injector
      32 Capsule holder
         42 Cavity
            44 Cavity Base
            138 Hydraulically actuated portion
            140 Fluid supply portion
         46 Extraction wall
         48 Outlet
      34 Capsule holder loading system
         108 Actuator unit
         110 Loading mechanism
            112 Planetary gear train
               116 Epicyclic gear train
               120 Sun gear
               122 Planet gears
               124 Carrier
            118 Annular gear
         114 Linear actuator 126 Rotary member
128 Guide member
132 Constraint unit
134 First guide
136 Complimentary second guide
36 Capsule insertion channel
38 Capsule Ejection channel
16 Capsule processing unit
50 Code reading system
74 Code reader
Code reading mechanism
52 Capsule transfer mechanism
142 Movable capsule support
144 Motion transmission member
54 Capsule detection system
Capsule detection sensors
18 Control system
56 User interface
58 Processing unit
62 Memory
Programs or programmed logic
60 Sensors
62 Fluid level sensors
64 Flow rate sensors
66 Temperature sensors
68 Position sensors
70 Fluid level sensors
72 Capsule detection sensors
74 Code reader
76 Capsule support
80 Angular velocity sensors
102 Power Supply
104 Communication interface
6 Capsule
100 Capsule axis of rotation
Example 1
82 Body portion
84 Lid portion
86 Flange portion
Example 2
88 Body portion
90 Lid portion
92 Flange portion
Example 3
94 Body portion
96 Lid portion
98 Flange portion
8 Receptacle

The invention claimed is:

1. A beverage preparation machine comprising: a beverage preparation module comprising an extraction unit to extract an ingredient of a beverage from a capsule supplied to the beverage preparation module or an ingredient container which is part of the beverage preparation module;
a fluid supply comprising a fluid heater, a fluid pump, and a fluid reservoir;
a first module comprising a first connection configured to movably connect the first module to the beverage preparation module, the first connection extending from a top or a bottom of the beverage preparation module to a top or a bottom of the first module: and
the beverage preparation machine further comprises a second module, the second module comprising a second connection configured to movably connect the second module to the first module, the second connection extending from the top or the bottom of the first module to a top or a bottom of the second module,
the first module comprising the fluid pump and/or the fluid heater, the second module comprising a component of the fluid supply different to those of the first module including at least one of the fluid pump, the fluid heater or the fluid reservoir,
whereby the first connection and the second connection are configured to maintain an operational functionality between the beverage preparation module, the first module and the second module while the first module and the second module are moved between a plurality of positions,
wherein at least one of the first connection or the second connection comprises a pivoted connection such that the beverage preparation module, the first module, and the second module are arrangeable in an infinite number of positions, and moving at least one of the first module or the second module relative to the beverage preparation module while operational functionality between the beverage preparation module, the first module, and the second module is maintained throughout the movement.

2. The beverage preparation machine according to claim 1, further comprising a third module, the third module comprising a third connection configured to movably connect the third module to the second module or the first module, the third module comprising the fluid reservoir, and the first module comprising only one of the fluid pump or fluid heater, whereby the third connection is configured to maintain an operational functionality between the third module, the first module and the second module while the first module, the second module and the third module are moved between a plurality of positions.

3. The beverage preparation machine according to claim 1, wherein a pivot axis of the pivoted connection is vertical when the beverage preparation machine abuts a horizontal support surface.

4. The beverage preparation machine according to claim 3, wherein at least one of the first module, the second module or the third module is elongate in a direction of the pivot axis.

5. The beverage preparation machine according to claim 1, wherein at least one of the first connection or the second connection comprises a rigid or flexible connection conduit for transmission of fluid between the beverage preparation module, the first module and/or the second module.

6. The beverage preparation machine according to claim 5, wherein the rigid or flexible connection conduit is arranged to form an abutment for supporting the beverage preparation machine on a support surface.

7. The beverage preparation machine according to claim 5, wherein an electrical communication member extends through the rigid or flexible connection conduit.

8. The beverage preparation machine according to claim 1, wherein the first module comprises a first connection conduit at a bottom surface of the first module configured to either: (i) inlet fluid into the first module; or (ii) outlet the fluid from the first module.

9. The beverage preparation machine according to claim 8, wherein the first module comprises a second connection conduit at a top surface of the first module, configured to the other of: (i) inlet the fluid into the first module; or (ii) to outlet the fluid from the first module.

10. The beverage preparation machine according to claim 1, wherein the extraction unit comprises:
a capsule holder operable to move between a capsule receiving position and a capsule extraction position;

a capsule holder loading system operable to actuate the capsule holder between the capsule receiving position and the capsule extraction position, the capsule holder loading system comprising an actuator unit and a loading mechanism, the actuator unit configured to actuate the loading mechanism;

the loading mechanism comprises a planetary gear train and a linear actuator, the actuator unit configured to supply a rotary motion to the planetary gear train, the planetary gear train configured to gear down the rotary motion, the linear actuator configured to: receive the geared down rotary motion; convert the geared down rotary motion into linear motion; and couple the linear motion to the capsule holder; and the first module and the second module are elongate with a same cross-sectional shape.

11. The beverage preparation machine according to claim 1, wherein the first module and the second module have a same cross-sectional appearance.

12. The beverage preparation machine according to claim 1, wherein the second module comprises:

a first connection conduit at a bottom surface of the second module to either: (i) inlet fluid into the second module; or (ii) outlet the fluid from the second module; and/or a second connection conduit at a top surface of the second module to the other of: (a) inlet the fluid into the second module; or (b) to outlet the fluid from the second module.

13. The beverage preparation machine according to claim 1, wherein the pivoted connection comprises an axle arranged to rotate relative to a sleeve, the sleeve is arranged on one of the first module or the second module, and the axle pivots within the sleeve or the sleeve pivots within the axle.

14. The beverage preparation machine according to claim 13, wherein the axle comprises a conduit for transmission of fluid between the beverage preparation module, the first module and/or the second module.

15. The beverage preparation machine according to claim 1, wherein the first connection is configured to maintain fluid connectivity between the first module to the beverage preparation module whilst the first module and the second module are moved between a plurality of positions, and wherein the second connection is configured to maintain fluid connectivity between the second module to the first module while the first module and the second module are moved between a plurality of positions.

16. A kit of parts for assembly into a beverage preparation machine, the kit of parts comprising:

a beverage preparation module, a first module, and a second module;

the beverage preparation module comprising an extraction unit to extract an ingredient of a beverage from a capsule supplied to the beverage preparation module or an ingredient container which is part of the beverage preparation module;

a fluid supply comprising a fluid heater, a fluid pump, and a fluid reservoir;

wherein the first module comprises a first connection configured to movably connect the first module to the beverage preparation module, the first connection extending from a top or a bottom of the beverage preparation module to a top or a bottom of the first module, the second module comprises a second connection configured to movably connect the second module to the first module, the second connection extending from the top or the bottom of the first module to a top or a bottom of the second module, the first module comprising a fluid pump and/or a fluid heater, the second module comprising a component of the fluid supply different to those of the first module including at least one of the fluid pump, the fluid heater or the fluid reservoir, whereby the first connection and the second connection are configured to maintain an operational functionality between the beverage preparation module, the first module, and the second module while the first module and second module are moved between a plurality of positions, wherein at least one of the first connection or the second connection comprises a pivoted connection such that the beverage preparation module, the first module and the second module are arrangeable in an infinite number of positions, and moving at least one of the first module or the second module relative to the beverage preparation module while operational functionality between the beverage preparation module, the first module, and the second module is maintained throughout the movement.

17. The kit of parts according to claim 16, wherein the pivoted connection comprises an axle arranged to rotate relative to a sleeve, the sleeve is arranged on one of the first module or the second module, and the axle pivots within the sleeve or the sleeve pivots within the axle.

18. The kit of parts according to claim 16, wherein the first connection is configured to maintain fluid connectivity between the first module to the beverage preparation module whilst the first module and the second module are moved between a plurality of positions, and wherein the second connection is configured to maintain fluid connectivity between the second module to the first module while the first module and the second module are moved between a plurality of positions.

19. A method of reconfiguring the arrangement of a beverage preparation machine, the method comprising:

providing a beverage preparation module comprising:

an extraction unit to extract an ingredient of a beverage from a capsule supplied to the beverage preparation module or an ingredient container which is part of the beverage preparation module;

a fluid supply comprising a fluid heater, a fluid pump, and a fluid reservoir; a first module comprising a first connection configured to movably connect the first module to the beverage preparation module, the first connection extending from a top or a bottom of the beverage preparation module to a top or a bottom of the first module; and the beverage preparation machine further comprises a second module comprising a second connection configured to movably connect the second module to the first module, the second connection extending from the top or the bottom of the first module to a top or a bottom of the second module, the first module comprising the fluid pump and/or the fluid heater, the second module comprising a component of the fluid supply different to those of the first module including at least one of the fluid pump, the fluid heater or the fluid reservoir, whereby the first connection and the second connection are configured to maintain an operational functionality between the beverage preparation module, the first module, and the second module while the first and second modules are moved between a plurality of positions, wherein at least one of the first connection or the second connection comprises a pivoted connection such that the beverage preparation module, the first module and the second module are arrangeable in an infinite number of positions; and moving at least one of the first module or the second module relative to the beverage preparation module while operational functionality between the beverage preparation module, the first module, and the second module is maintained throughout the movement.

20. The method according to claim 19, wherein the pivoted connection comprises an axle arranged to rotate relative to a sleeve, the sleeve is arranged on one of the first module or the second module, and the axle pivots within the sleeve or the sleeve pivots within the axle.

* * * * *